United States Patent Office 3,324,051
Patented June 6, 1967

3,324,051
POLYMERIZATION OF EPOXIDES AND
EPISULFIDES
Joginder Lal, Cuyahoga Falls, Ohio, assignor to The
Goodyear Tire & Rubber Company, Akron, Ohio, a
corporation of Ohio
No Drawing. Filed Dec. 13, 1963, Ser. No. 330,270
20 Claims. (Cl. 260—2)

This invention relates to a novel process for the polymerization of epoxide and episulfide monomers and to the catalysts employed.

PROLOGUE

A variety of catalysts are known to be capable of polymerizing alkylene oxides to produce polymers. Such known catalysts are metal halides, metal halide-alkylene oxide complexes, metal alkoxides, and carbonates of the alkaline earth metals. More recently it has been disclosed that metal dialkyl compounds in combination with water, organic alcohols or oxygen are suitable catalysts for polymerizing alkylene oxides. It has been observed, however, that the metal dialkyl to water ratio, at which substantial polymer yields are obtained, exists through a narrow range from approximately 0.8 to 1.1.

Accordingly, it is an object of this invention to discover new and useful catalyst systems to polymerize epoxides and episulfides to high molecular weight polymers, copolymers and terpolymers. It is a further object of the invention to discover a new catalyst system for which the polymer yield is less critically restricted by the proportions of the catalyst components. These and other objects will readily become apparent by the teachings in the instant specification.

PRESENT INVENTION

In its broad scope the subject invention is useful for polymerizing compounds broadly characterized as epoxides and episulfides, and particularly those materials known as oxirane

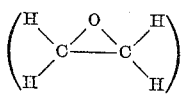

and thiirane

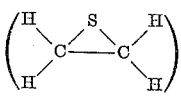

and the mono-, di-, tri-, and tetra-substituted derivatives thereof, to form amorphous or crystalline elastomers or plastics. The substituents for oxirane or thiirane hydrogen which may be employed are any hydrocarbon, oxyhydrocarbon, or thiohydrocarbon radical. Especially useful are such radicals containing up to about ten carbon atoms. It should also be observed that the substitution of halogen atoms for hydrogen atoms in the hydrocarbon, oxyhydrocarbon, or thiohydrocarbon radical will not affect their usefulness in the practice of the invention providing such halogen atoms are inert under the conditions of use. For example, the halogen atoms must not react with the catalyst and impair its activity. Such halogen substituents are thus deemed to be the equivalent of the hydrocarbon, oxyhydrocarbon and thiohydrocarbon radicals for the purposes of practicing this invention. Representative examples of substituents of oxirane and thiirane which may be usefully employed in the practice of my invention are alkyl (especially alkyl having up to ten carbon atoms), cycloalkyl, aryl, aralkyl, alkenyl, alkoxyalkyl, alkenoxyalkyl, alkoxy and alkenoxy radicals.

Examples of epoxides which are derivatives of oxiranes are:

ethylene oxide,
propylene oxide,
1-butene oxide,
2-butene oxide (cis or trans),
1-hexene oxide,
1-octene oxide,
2-octene oxide (cis or trans),
1-dodecene oxide,
styrene oxide,
3-phenyl-1,2-epoxypropane (benzyl ethylene oxide),
3,3,3-trifluoro-1,2-epoxypropane,
epichlorohydrin,
epibromohydrin,
epifluorohydrin,
butadiene monoxide,
isoprene monoxide,
1,2-epoxy-3-methacrylatopropane (glycidyl methacrylate),
1,2-epoxy-3-ethoxypropane,
1,2-epoxy-3-($\beta$-chloro ethoxy) propane,
1,2-epoxy-3-phenoxypropane,
1,2-epoxy-3 (p-chlorophenoxy) propane,
1,2-epoxy-3-allyloxypropane (allyl glycidyl ether),
4,5-epoxy-1-hexene,
1-phenyl-1,2-epoxypropane,
isobutylene oxide,
cyclohexene oxide,
cyclooctene oxide (cis or trans),
cyclododecene oxide,
indene oxide,
1-vinyl-3,4-epoxycyclohexane,
dicyclopentadiene monoxide,
limonene monoxide,
1,2-diphenyl ethylene oxide,
2,3-epoxypentane,
1,1,2-trimethyl ethylene oxide,
2,4,4-trimethyl-2,3-epoxypentane,
2,4,4-trimethyl-1,2-epoxypentane, and
1,1,2,2-tetramethyl ethylene oxide.

Examples of substituted thiirane monomers suitable for use in practicing my invention are:

ethylene sulfide,
propylene sulfide,
1-butene sulfide,
2-butene sulfide (cis or trans),
styrene sulfide,
1,2-epithio-3-chloropropane,
butadiene monosulfide,
1,2-epithio-3-allyloxypropane (allyl thioglycidyl ether),
1-vinyl-3,4-epithiocyclohexene,
isobutylene sulfide,
1,1,1-trimethyl ethylene sulfide,
1,1,2,2-tetramethyl ethylene sulfide, and
3,3,3-trifluoro-1,2-epithiopropane.

CATALYST

The catalyst employed in the practice of the invention is a mixture of two components. The primary component has the generic formula $MR'_n$. The secondary component consists of a member of the group consisting of sulfur, selenium, tellurium and compounds having the formula Z—$Y_m$—Z. In these formulae, Y represents a member selected from the group consisting of sulfur, selenium and tellurium; Z represents a member selected from the group consisting of acyl, aroyl, and allyl radicals when $m$ is an integer greater than 1; Z represents a member selected from the group consisting of hydrocarbon, oxyhydrocarbon and thiohydrocarbon radicals when $m$ is an integer greater than 2; M represents at least one metal selected from the group consisting of zinc, magnesium, cadmium and aluminum; R' represents at least one member selected from the group consisting of hydrocarbon radicals and hydrogen; and $n$ represents the valence of M.

Representative examples of the secondary component which may be usefully employed in practicing this invention are sulfur, selenium and tellurium in any of their allotropic forms; compounds of these elements such as selenium sulfide or tellurium sulfide; and organic polysulfides such as diallyl disulfide, dibenzoyl disulfide, diacetyl disulfide, di-tertiary-butyl tetrasulfide, di-tertiary-octyl oxapentamethylene tetrasulfide), and poly(3-thiapentamethylene tetrasulfide). In practicing my invention sulfur is preferred.

Representative examples of the primary component which may be usefully employed in the practice of my invention are dimethylzinc, diethylzinc, dibutylzinc, diisobutylzinc, diphenylzinc, dibenzylzinc, diallylzinc, zinc hydride, diethylmagnesium, diphenylmagnesium, diethylcadmium, trimethylaluminum, triethylaluminum, triisobutylaluminum and diethylaluminum hydride. Within the group of metals represented by M, zinc is preferred. Within the class of materials represented by R', alkyl radicals with up to ten carbon atoms are found to be particularly convenient. Diethylzinc is a convenient and preferred primary component.

While the amount of catalyst used in the practice of this invention is not critical, it is to be understood that a sufficient amount should be used to provide a catalytic effect. Excellent results are obtained by employing from $10^{-7}$ to $10^{-1}$ mols of catalyst per gram of monomer.

The ratio of secondary to primary component may vary over a wide range and still enable the catalyst to function to produce substantial polymer conversion. This range may vary as the primary and secondary components vary in their nature. For any specific pair of primary and secondary components one may easily determine the optimum ratio by techniques well known in the art and disclosed in the examples below. The optimum atomic ratio of the sulfur, selenium, tellurium and Y of the secondary component to the metal of the primary component is usually found in the range from 0.1 to 20 or more. This optimum atomic ratio is more often found in the range from about 0.5 to 15. The preferred range for this atomic ratio is between 1 and 8. In the preferred case where the secondary component is elemental sulfur and the primary component is diethylzinc, maximum conversions occur in the preferred range wherein the atomic ratio of sulfur to zinc is from 2 to 8, with the maximum conversion at approximately 3.

POLYMERIZATION AND RECOVERY

In practicing this invention the reaction temperature may be varied over a wide range; for instance, from about $-50°$ to about $200°$ C. It has been found that a temperature of 0 to $100°$ C. is convenient for carrying out polymerizations. As is well understood with reactions of this type, the reaction time generally increases with decreasing temperature, although other commonly understood factors also influence the polymerization rate. While the process may be conducted at supra-atmospheric, as well as sub-atmospheric pressures, such as are frequently utilized for polymerization reactions, it is an advantage of the subject invention that the process may be performed with good results either very near to or at atmospheric pressure.

The polymerization should be conducted in an inert ambient. Suitable for this purpose would be an atmosphere of any known inert gas, such as nitrogen, argon, helium; or a vacuum. The polymerization process of this invention may be carried out either in bulk or in an inert solvent or suspending medium. For this purpose any suitable common aromatic, cycloaliphatic, aliphatic hydrocarbon, halogenated hydrocarbon, or ether may be used; as for example, benzene, cyclohexane, heptane, hexane, chlorobenzene, carbon tetrachloride, diethyl ether, tetrahydrofuran and the like. Benzene has been found to be a convenient and economical solvent for this purpose. Variations in the above process variables will result in different requirements for the amount of catalyst used, as well as different degrees of stereoregularity and molecular weight in the resulting polymers.

The rubbery polyepoxides and polyepisulfides produced in the practice of the subject invention are high molecular weight polymers possessing good elastomeric properties. In addition to the polymers formed by polymerizing monomers of the general type disclosed, the catalyst of the subject invention may be used to form saturated copolymers thereof as well as unsaturated, vulcanizable copolymers. Examples of the saturated copolymers would be the copolymers of ethylene oxide and propylene oxide or ethylene sulfide and propylene sulfide. A vulcanizable copolymer would result, for example, from polymerizing allyl glycidyl ether and propylene oxide monomers; or vinyl cyclohexene oxide and 1-butene oxide monomers; or cyclooctadiene monoxide and propylene oxide monomers; or dicyclopentadiene monoxide and propylene oxide monomers. Other examples of the sulfide copolymers would result from the copolymerization of allyl thioglycidyl ether and propylene sulfide. An example of a vulcanizable halogen substituted copolymer is that formed by the copolymerization of epichlorohydrin and propylene oxide. More complicated interpolymers are also envisioned as falling under the scope of this invention. For example, to control crystallinity, to improve vulcanizability or otherwise modify and improve the polymers made by this process it may be beneficial to use one or more than one saturated epoxide monomer in conjunction with one or more unsaturated epoxide monomer; e.g., the product obtained by copolymerizing ethylene oxide, propylene oxide and allyl glycidyl ether monomers; or propylene oxide, styrene oxide and allyl glycidyl ether monomers; or propylene oxide, allyl glycidyl ether and vinyl cyclohexene oxide monomers.

Copolymers and terpolymers, such as those enumerated in the examples above, as well as many others which will be apparent to one skilled in the art, all produce useful polymeric materials. Of special practical significance, however, are copolymers and terpolymers prepared by polymerizing together the monomeric materials comprising between 80 and 99 mol percent of at least one member selected from the group consisting of proplyene oxide, 1-butene oxide, 1-hexane oxide, 1-octene oxide, and mixtures thereof; and 20 to 1 percent comprising at least one member selected from the group consisting of allyl glycidyl ether, vinyl cyclohexene monoxide, epichlorohydrin, dicyclopentadiene monoxide, isoprene monoxide, butadiene monoxide, limonene monoxide, 4,5-epoxy-1-hexene, and mixtures thereof.

The elastomers produced by my invention may be compounded and processed by normal procedures known in the art. They are readily compounded with fillers such as carbon black, silica, etc., and with antioxidants and other conventional compounding materials. The unsaturated elastomers are readily vulcanized with the aid of conventional sulfur-accelerator vulcanizing systems appropriate for the degree of unsaturation in the elastomer. Copolymers of epichlorohydrin with other epoxides may be vulcanized according to the methods known to the art, e.g., they may be crosslinked with an amine containing at least two primary amino groups or with a mixture of an amine and at least one other agent selected from the group consisting of sulfur, dithiocarbamates, thiuram sulfides and thiazoles.

EXAMPLES

The practice of this invention is illustrated by reference to the following examples which are intended to be representative rather than restrictive of the scope. All polymerization operations were conducted under a nitrogen atmosphere.

As employed in the data presented infra: "Inherent Viscosity" (I.V.) is defined as the natural logarithm of the relative viscosity at 30° C. divided by the polymer concentration for a 0.05 to 0.2% solution in benzene containing 0.1% phenyl beta-naphthylamine (PBNA), and expressed in units of dl./g. "Swelling Ratio" of the benzene-insoluble material in a vulcanizate is defined as the ratio of the volume of the swollen sample, after immersion in benzene for 68 hours at 25° C., to its volume after drying. The polymer yield includes catalyst residues, if any.

*Example 1*

A series of experimental runs utilizing different catalyst concentrations and polymerization times were conducted according to the following general procedure. Into a 4-oz. bottle was added 40 ml. of benzene (distilled over phosphorous pentoxide or passed through a silica gel column). High purity nitrogen was bubbled through the benzene for 2 minutes. The required amount of co-catalyst or secondary catalyst component was dissolved (or suspended) in the benzene solvent and the bottle fitted with a serum cap. A calculated amount of diethylzinc solution (in heptane or benzene) was injected into the bottle. The reaction between the diethylzinc and the secondary catalyst component was allowed to take place at room temperature for at least half an hour. A control polymerization bottle without the secondary catalyst component was similarly prepared. 40 ml. of high purity propylene oxide, through which nitrogen had been bubbled, was injected into the bottle. The serum cap was replaced by a screw cap having a polyethylene liner. The bottles were tumbled in a 50° C. bath for a given time. Polymerization was stopped by adding a mixture of 5 ml. of water and 10 ml. of methanol containing 0.1 weight percent phenyl beta-naphthylamine stabilizer. The polymers were aspirator dried for 24 hours and then under 2 mm. Hg pressure for about 68 hours at 40° C. The polymer yield and inherent viscosity of the series of polymerization runs are shown in Table I and Table II.

TABLE I.—POLYMERIZATION OF PROPYLENE OXIDE WITH DIETHYLZINC AND SULFUR

[40 ml. benzene + 40 ml. monomer + 4.65 millimols of diethylzinc and sulfur, as indicated, 50° C., 2.25 hrs.]

| Run No. | Weight of Sulfur, g. | S/Zn [1] Ratio | Polymer Yield, Percent | Inherent Viscosity |
|---|---|---|---|---|
| 1 | 0 | 0 | 2.7 | 0.6 |
| 2 | 0.074 | 0.5 | 3.3 | 7.0 |
| 3 | 0.148 | 1 | 9.9 | 4.35 |
| 4 | 0.296 | 2 | 72.5 | 5.43 |

[1] S/Zn represents sulfur/zinc atomic ratio.

TABLE II.—POLYMERIZATION OF PROPYLENE OXIDE WITH DIETHYLZINC AND SULFUR

[40 ml. benzene, 40 ml. monomer, 2.33 millimols diethylzinc and sulfur, as indicated, 50° C., 7.67 hrs.]

| Run No. | Weight of Sulfur, g. | S/Zn [1] Ratio | Polymer Yield, Percent | Inherent Viscosity |
|---|---|---|---|---|
| 1 | 0 | 0 | 2.0 | 2.2 |
| 2 | 0 | 0 | 4.0 | 1.6 |
| 3 | 0.037 | 0.5 | 2.5 | 3.1 |
| 4 | 0.074 | 1 | 2.0 | 5.3 |
| 5 | 0.148 | 2 | 62.6 | 10.4 |
| 6 | 0.222 | 3 | 91.3 | 9.0 |
| 7 | 0.296 | 4 | 88.0 | 9.6 |
| 8 | 0.444 | 6 | 80.2 | 9.7 |
| 9 | 0.592 | 8 | 74.4 | 9.0 |

[1] S/Zn represents sulfur/zinc atomic ratio.

*Example 2*

Utilizing experimental procedures identical to those in Example 1 (except as noted) selenium and several organic polysulfides (including a commercially available polymeric polysulfide, Thiokol VA-7) were employed as sulfur-bearing additives to form a co-catalyst with diethylzinc.

TABLE III

[60 ml. benzene, 20 ml. propylene oxide, 4.65 millimols of diethylzinc and additive, as indicated, 50° C., 2 hours]

| I Run No. | II Additive | III S/Molecule Additive | IV Mol. Ratio, Add./Et₂Zn | V Ratio, S/Zn | VI Polymer Yield, percent | VII I.V. |
|---|---|---|---|---|---|---|
| 1 | Di-tert.-butyl disulfide | 2 | 1 | 2 | 2.4 | 0.5 |
| 2 | do | 2 | 2 | 4 | 2.8 | 1.7 |
| 3 | Di-tert.-butyl polysulfide | 5.5 | 1 | 5.5 | 4.2 | 0.8 |
| 4 | Di-tert.-octyl polysulfide | 4.6 | 1 | 4.6 | 10 | 0.16 |
| 5 | VA-7 [1] | 4.5 | 1 | 4.5 | 21.6 | 6.35 |
| 6 | Sulfur | 8 | 3/8 | 3 | 15.6 | 11.7 |
| 7 | None | | 0 | 0 | 2.9 | 0.7 |
| 8 | Selenium [2] | | | | 25.7 | 10.4 |

[1] VA-7 contained 63.4 percent sulfur and is believed to contain 4.5 sulfur atoms in the repeat unit of the polymer.
[2] Atomic ratio of selenium to zinc was 1:1. Polymerization time=6 hours.
Column III—S/Molecule Additive=Sulfur atoms per molecule of additive.
Column IV—Mol. Ratio Add./Et₂Zn=Molar ratio of additive to diethylzinc.
Column V—Ratio S/Zn=Atomic ratio of sulfur (in the additive) to zinc.
Column VII—I.V.=Inherent Viscosity.

*Example 3*

Into a clean bottle was added 200 ml. of benzene which had previously been dried by passing through a silica gel column. High-purity nitrogen was bubbled through the benzene for two minutes. 2.22 grams of sulfur was dissolved in the benzene solvent and the bottle fitted with a serum cap. 9 ml. of diethylzinc solution (1.94 molar solution in benzene) was injected into the bottle. The reaction between diethylzinc and sulfur was allowed to take place at room temperature for at least half an hour. 600 ml. of high-purity styrene oxide, through which nitrogen had been bubbled, was injected into the bottle. The serum cap was replaced by a screw cap having a polyethylene liner. The bottle was placed in a 50° bath for 90 hours and was shaken occasionally. Polymerization was stopped by adding 100 ml. of methanol containing 0.1 weight percent phenyl beta-naphthylamine stabilizer. The polymer was extracted with methanol for one week in a Soxhlet extractor and for another week with an acetone-methanol mixture. It was dried at 100° C. under aspirator vacuum for 68 hours and then under a vacuum pump for 48 hours. 500 grams (79% yield) of polymer were obtained. The inherent viscosity was 3.0 dl./g. The heat-distortion temperature of the polymer was found to be 52° C. by the ASTM method D648–56.

*Example 4*

A mixture of 200 ml. propylene oxide, 50 ml. 1-butene oxide, 9 ml. allyl glycidyl ether and 500 ml. benzene was polymerized at 50° C. for 24 hours with a preformed catalyst prepared from 1.78 grams of sulfur and 12 ml. of diethylzinc solution in heptane (1.54 molar). The sulfur/zinc atomic ratio in the catalyst was 3:1. A yield of 60 grams of a rubbery material having an inherent viscosity of 4.65 was obtained.

Example 5

A catalyst suspension was prepared under nitrogen from 50 ml. of benzene, 0.89 gram of sulfur and 3.6 ml. of diethylzinc solution in benzene (1.94 molar). The sulfur/zinc atomic ratio in this catalyst was 4:1. A solution consisting of 515 ml. dry benzene and 185 ml. liquified ethylene oxide was passed over silica gel contained in the column of a condenser. The silica gel was cooled by circulating cold water around the column. Into a bottle containing 75 ml. of the dried ethylene oxide-benzene solution was injected 10 ml. of the above catalyst suspension. Polymerization was allowed to take place at 50° C. for one hour and twenty minutes. Polymerization was terminated with 20 ml. of methanol containing 0.2 percent PBNA and the contents dried. The polymerized material was a solid and weighed 11.5 grams. It had an inherent viscosity of 7.0 dl./g. The poly (ethylene oxide) was highly birefringent when examined under a polarizing microscope.

Example 6

5.34 grams of sulfur was suspended in 200 ml. of benzene contained in a bottle. Nitrogen was bubbled through the mixture for 2 minutes. 28.8 ml. of diethylzinc solution in benzene (1.94 molar) was injected into the bottle and the bottle was fitted with a serum cap. The sulfur/zinc atomic ratio in the catalyst was 3:1. A mixture of 10 ml. of freshly distilled propylene sulfide and 10 ml. propylene oxide was added to 100 ml. of benzene. This mixture was polymerized under nitrogen at 25° C. with 16.5 ml. of the catalyst suspension prepared above. After termination with methanol and vacuum drying, a yield of 18.3 grams of an elastomeric material was obtained. It had an inherent viscosity of 0.4 dl./g.

Example 7

A mixture of 250 ml. 1-butene oxide and 12 ml. allyl glycidyl ether was polymerized at 50° C. with a preformed catalyst prepared from 1.78 grams of sulfur and 12 ml. of diethylzinc solution in benzene (2.23 molar) in 500 ml. of benzene. The atomic ratio of sulfur/zinc in the catalyst was 2.1:1. After 90 hours, the polymerization was terminated. A yield of 70 grams of a rubbery material was obtained. This material was compounded according to the recipe in Example 17, Table V. Curing was done for 30 minutes at 310° F. The vulcanizate had a swelling ratio of 8.0 and 2.4 percent solubility.

Example 8

A mixture of 47.1 grams of propylene sulfide and allyl thioglycidyl ether (molar ratio 95:5) was stirred with 0.14 gram of sulfur in an 8-oz. bottle. The clear solution was reacted with 0.2 ml. of diethylzinc solution in benzene (2.1 molar). Polymerization was allowed to take place at 25° C. for 18 hours. The viscous mass was precipitated in excess methanol (containing 0.1% phenyl beta-naphthylamine) and dried. The yield of the polymer was 23 grams. It had an inherent viscosity of 2.0 dl./g.

Example 9

0.27 gram of sulfur was dissolved in a mixture of 50 ml. of purified 1-butene oxide and 5 ml. of distilled 1-vinyl-3,4-epoxycyclohexane. 1 ml. of diethylzinc solution in benzene (2.1 molar) was injected into the solution. The mixture was allowed to polymerize at 50° C. for 2 hours and 50 minutes. A yield of 10.75 grams of an elastomeric material having an inherent viscosity of 3.1 dl./g. was obtained.

Example 10

A mixture of 80 ml. of dry benzene and 10 ml. of propylene sulfide was polymerized at 30° C. with 19.8 ml. of the catalyst suspension described in Example 6. The time of polymerization was 16.7 hours. The polymerization mixture was precipitated in excess methanol containing 0.1 percent phenyl beta-naphthylamine (PBNA). The dried polymer weighed 9.45 grams (97.5 percent yield) and had an inherent viscosity of 0.50. When the polymerization was carried out similarly with 2.4 ml. of diethylzinc solution in benzene (1.94 molar) as catalyst, the obtained polymer weighed 3.95 grams (40 percent yield) and had an inherent viscosity of 0.4 dl./g.

Example 11

20 ml. of freshly distilled 1-butene sulfide was injected into a 4-oz. bottle containing 50 ml. of benzene, 0.444 gram of sulfur and 1.8 ml. of diethylzinc solution in benzene (1.94 molar). The sulfur/zinc atomic ratio in the catalyst was 4:1. After polymerization at 30° C. for 67 hours, the polymerized mass was precipitated and worked up as in Example 10 to yield 16.6 grams of a polymeric material, having an inherent viscosity of 0.80.

Example 12

Into a solution containing 0.22 gram of sulfur in 40 ml. of propylene oxide and 40 ml. of benzene was injected 5 ml. of diphenylzinc solution in tetrahydrofuran (0.43 molar). Polymerization was allowed to proceed at 50° C. On termination with methanol and drying of the mixture, a polymeric material was obtained.

Example 13

0.14 gram of sulfur was dissolved in 40 ml. of freshly distilled propylene sulfide in a 4-oz. bottle fitted with a serum cap. The bottle was chilled to −20° C. and 0.2 ml. of diethylzinc solution (2.1 molar) was injected. The bottle was tumbled in a bath kept at −20° C. After 18 hours, the viscous mass was precipitated in excess methanol containing 0.1 percent phenyl beta-naphthylamine and dried. The yield of polymer was 11.4 grams. It had an inherent viscosity of 1.65 dl./g.

Example 14

To 80 ml. of purified 1-butene oxide was added 3.18 grams of dibenzoyl disulfide, followed by 1.8 ml. of diethylzinc solution in benzene (1.94 molar). The molar ratio of dibenzoyl disulfide to diethylzinc was 3:1 in this polymerization recipe. After polymerization for 17 hours at 50° C., a yield of 26 grams of a rubbery material, having an inherent viscosity of 6.0 dl./g. was obtained.

Example 15

The experiment in Example 14 was repeated using 1.53 grams of diallyl disulfide in place of dibenzoyl disulfide. The obtained polymer had an inherent viscosity of 1.2 dl./g.

Example 16

To a 4-oz. nitrogen-flushed bottle was added 0.7 gram ($1.04 \times 10^{-2}$ mols) of powdery zinc hydride and 40 ml. of dry benzene, followed by 1.34 grams of sulfur ($4.2 \times 10^{-2}$ gram atoms). The bottle was capped and after 45 minutes 40 ml. of 1-butene oxide (distilled over calcium hydride) was injected. Polymerization was allowed to proceed at 50° C. for 68 hours. It was terminated with 30 ml. of methanol containing 0.3% phenyl beta-naphthylamine. The dried polymer weighed 3.3 grams and had an inherent viscosity of 0.9 dl./g.

Example 17

A vulcanizable copolymer of propylene oxide and allyl glycidyl ether was prepared by the general procedure outlined in Example 1 with exceptions as noted. The copolymerization data together with the vulcanization recipe and physical properties are shown in Table IV.

TABLE IV.—COPOLYMER OF PROPYLENE OXIDE AND ALLYL GLYCIDYL ETHER AND ITS VULCANIZATION

A. Copolymerization

S/Zn atomic ratio=3:1

| | |
|---|---|
| Benzene _____ml__ | 500 |
| Sulfur _____g__ | 1.776 |
| 1.54 molar diethylzinc solution ____ml__ | 12 |

Molar charge ratio 97.2:2.8

| | |
|---|---|
| Propylene oxide _____ml__ | 160 |
| Allyl glycidyl ether _____ml__ | 8 |
| Polymerization temp. _____° C__ | 50 |
| Polymerization time _____hours__ | 21 |
| Yield=74 g. (51%) | |
| Inherent viscosity | 3.8 |

B. Vulcanization recipe

| | Parts by weight |
|---|---|
| Rubber | 100 |
| Zinc oxide | 5 |
| Stearic acid | 3 |
| Sulfur | 2 |
| Tuax | 1 |
| Tellax | 0.5 |

Cure: 90'/296° F.

C. Stress-strain properties and swelling data

| | |
|---|---|
| Tensile strength, p.s.i. | 1935 |
| Elongation-at-break, percent | 725 |
| 300% modulus, p.s.i. | 300 |
| Swelling ratio (benzene) | 8.95 |

The vulcanizate had an inflection temperature of −57° C. in the Gehman low temperature, torsion-flex test. The glass transformation temperature of this polymer is estimated to be about −70° C.

Example 18

1.096 grams of dibenzoyl disulfide was dissolved in 40 ml. of propylene oxide (distilled over calcium hydride). After purging with nitrogen, 2 ml. of triisobutylaluminum solution in benzene (1 molar) was added and this reaction mixture was polymerized at 50° C. The molar ratio of benzoyl disulfide to triisobutylaluminum in the catalyst was 2:1. Polymerization for 16 hours gave 6.0 grams of a polymer having an inherent viscosity of 0.24.

Example 19

A solution containing 40 ml. dry benzene, 40 ml. high purity epichlorohydrin and 0.256 gram sulfur was purged with nitrogen and 2 ml. of triisobutylaluminum solution in benzene (1 molar) was injected into the solution. This reaction mixture was polymerized at 50° C. The atomic ratio of sulfur to aluminum in the catalyst was 4:1. The viscous mass, obtained after polymerization for 40 hours, was precipitated in excess methanol containing 0.1 weight percent phenyl 2-naphthylamine stabilizer. The yield of the polymer was 16.5 grams. It had an inherent viscosity of 0.14. The polymer was compounded with 5 parts of Rosin Amine D, 5 parts of sulfur and 2.5 parts of tetramethyl thiuram disulfide. (All parts in the compounding recipe are per 100 parts by weight of the polymer). Vulcanization at 300° F. for 45 minutes yielded a product which was substantially insoluble in benzene.

Example 20

A mixture of 100 ml. propylene oxide (distilled over calcium hydride) and 5.9 ml. of high purity epichlorohydrin was polymerized with 0.256 gram of sulfur and 2 ml. of triisobutylaluminum solution as in Example 19. Polymerization at 50° C. for 137 hours gave 52 grams of a polymeric material.

Example 21

Into 19.6 grams of distilled 2-octene oxide, contained in a 4-oz. bottle flushed with nitrogen, was injected 10 ml. of catalyst suspension. This catalyst suspension was prepared under nitrogen by injecting 10 ml. of triisobutylaluminum solution (1 molar in benzene) into a solution of 1.28 grams of sulfur in 100 ml. of benzene. Polymerization at 50° C. for 40 hours yielded 3.5 grams of a polymer having an inherent viscosity of 0.1.

While certain representative embodiments and details have been shown for the purpose of illustrating the invention, it will be apparent to those skilled in this art that various changes and modifications may be made therein without departing from the spirit or scope of the invention.

What is claimed is:
1. The polymerization process which comprises:
(I) Selecting a monomeric material which comprises at least one member of the group consisting of epoxides and episulfides with the formula

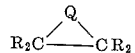

(a) wherein Q is a member of the group consisting of oxygen and sulfur; and
(b) wherein R is a member of the group consisting of hydrogen, hydrocarbon radicals, oxyhydrocarbon radicals and thiohydrocarbon radicals containing up to 10 carbon atoms;
(II) Mixing said monomeric materials with a catalytic amount of a catalyst comprising a mixture of:
(a) at least one member selected from the group consisting of sulfur, selenium, tellurium and compounds with the formula $Z—Y_m—Z$;
(1) wherein Y is a member selected from the group consisting of sulfur, selenium and tellurium;
(2) wherein Z is a member selected from the group consisting of acyl, aroyl and allyl when $m$ is an integer greater than 1; and
(3) wherein Z is a member selected from the group consisting of hydrocarbon radicals, oxyhydrocarbon radicals and thiohydrocarbon radicals when $m$ is an integer greater than 2; and
(b) at least one substituent with the formula $MR'_n$;
(1) wherein R' is, individually, a member selected from the group consisting of hydrocarbon radicals containing up to 10 carbon atoms and hydrogen;
(2) M is a metal selected from the group consisting of zinc, magnesium, cadmium, aluminum and mixtures thereof;
(3) $n$ is the valence of the metal M;
(III) Reacting said mixture under suitable polymerization conditions until a polymer is formed.
2. The process according to claim 1 wherein the monomeric material comprises at least one member of the alkylene oxides represented by the formula

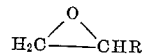

3. The process according to claim 1 wherein the monomeric materials comprise between 80 and 99 mol percent of at least one member selected from the group consisting of propylene oxide, 1-butene oxide, 1-hexene oxide, 1-octene oxide and mixtures thereof; and 20 to 1 percent comprising at least one member selected from the group consisting of allyl glycidyl ether, vinyl cyclohexene monoxide, epichlorohydrin, dicyclopentadiene monoxide, isoprene monoxide, butadiene monoxide, limonene monoxide, 4,5-epoxy-1-hexenes, and mixtures thereof.

4. The process according to claim 1 wherein the monomeric material comprises at least one alkylene sulfide represented by the formula

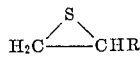

5. The process according to claim 1 wherein $MR'_n$ represents dialkylzinc.

6. The process according to claim 1 wherein the catalyst is a mixture of materials represented by the formulas $MR'_n$ and $Z-Y_m-Z$.

7. The process according to claim 6 wherein $MR'_n$ represents dialkylzinc and $Z-Y_m-Z$ represents a diaroyl polysulfide.

8. The process according to claim 1 wherein the catalyst is a mixture consisting of $MR'_n$ and sulfur, and wherein the atomic ratio of sulfur to metal is greater than 0.2.

9. The process according to claim 1 wherein the monomeric material is represented by the formula

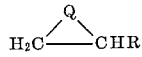

and the catalyst is a mixture of dialkylzinc and sulfur and wherein the atomic ratio of sulfur to zinc is greater than 1.

10. The process according to claim 1 wherein the monomeric material is represented by the formula

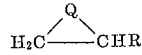

and the catalyst is a mixture of trialkylaluminum and sulfur and wherein the atomic ratio of sulfur to aluminum is greater than 1.

11. The process according to claim 1 wherein the monomeric material comprises 80–99 mol percent of an alkylene sulfide represented by the formula

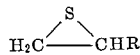

and 20 to 1 mol percent comprising allyl thioglycidyl ether.

12. The process according to claim 1 wherein the monomeric material comprises 80 to 99 mol percent of a member selected from the group consisting of propylene oxide, 1-butene oxide, 1-hexene oxide, 1-octene oxide and mixtures thereof; and 20 to 1 mol percent comprising at least one member selected from the group consisting of allyl glycidyl ether, vinyl cyclohexene monoxide, epichlorohydrin, dicyclopentadiene monoxide, isoprene monoxide, butadiene monoxide, limonene monoxide, 4,5-epoxy-1-hexene, and mixtures thereof; and a catalyst comprising a mixture of diethylzinc and sulfur wherein the atomic ratio of sulfur to zinc is between 2 and 8.

13. The process according to claim 1 wherein the monomeric material is styrene oxide, the catalyst is a mixture of diethylzinc and sulfur, and wherein the atomic ratio of sulfur to zinc is between 2 and 8.

14. The process according to claim 1 wherein the monomeric material is ethylene oxide, the catalyst is a mixture of diethylzinc and sulfur, and wherein the atomic ratio of sulfur to zinc is between 2 and 8.

15. A composition of matter for use as a catalyst which comprises essentially:
(I) A primary component represented by the formula $MR'_n$;
(II) A secondary component selected from the group consitsing of sulfur, selenium, tellurium and compounds with the formula $Z-Y_m-Z$;
and wherein
  (a) the atomic ratio of the sulfur, selenium, tellurium and Y of the secondary component to M is greater than 1; and
  (b) R' is, individually, a member selected from the group consisting of hydrocarbon radicals containing up to 10 carbon atoms and hydrogen;
  (c) M is a metal selected from the group consisting of zinc, magnesium, cadmium, aluminum and mixtures thereof;
  (d) $n$ is the valence of the metal M;
  (e) Y is a member selected from the group consisting of sulfur, selenium and tellurium; and
  (f) Z is a member selected from the group consisting of acyl, aroyl and allyl radicals when $m$ in an integer greater than 1, and Z is a member selected from the group consisting of hydrocarbon radicals, oxyhydrocarbon radicals and thiohydrocarbon radicals, when $m$ is an integer greater than 2.

16. A composition of matter for use as a catalyst, according to claim 15, wherein $Z-Y_m-Z$ represents a diaroyl polysulfide and $m$ is greater than 1.

17. A composition of matter for use as a catalyst, according to claim 15, wherein the secondary component is a material represented by the formula $Z-Y_m-Z$ and wherein Z represents a member selected from the group consisting of a hydrocarbon radical, an oxyhydrocarbon radical and a thiohydrocarbon radical and $m$ is greater than 2.

18. A composition of matter for use as a catalyst, according to claim 15, wherein the primary component is represented by the formula $MR'_n$, wherein the secondary component is sulfur, and the atomic ratio of the sulfur to the metal atoms in the primary component is greater than 1.

19. A composition of matter for use as a catalyst in accordance with claim 18 wherein the primary component is dialkylzinc.

20. A composition of matter for use as a catalyst in accordance with claim 18 wherein the primary component is diethylzinc.

References Cited

UNITED STATES PATENTS 3,231,551  1/1966  Herold et al. _____ 260—2

OTHER REFERENCES

Nomenclature of Chemical Compounds from Chemical Abstracts, copy in Group 140, Index, vol. 56 (pp. 90N–91N).

WILLIAM R. SHORT, *Primary Examiner.*

T. PERTILLA, *Assistant Examiner.*

UNITED STATES PATENT OFFICE

CERTIFICATE OF CORRECTION

Patent No. 3,324,051                           June 6, 1967

Joginder Lal

It is hereby certified that error appears in the above numbered patent requiring correction and that the said Letters Patent should read as corrected below.

Column 3, lines 11 and 12, after "di-tertiary-octyl" insert -- pentasulfide, poly (tetramethylene tetrasulfide), poly(3- --; column 4, line 49, for "1-hexane" read -- 1-hexene --.

Signed and sealed this 12th day of November 1968.

(SEAL)
Attest:

Edward M. Fletcher, Jr.                        EDWARD J. BRENNER
Attesting Officer                                Commissioner of Patents

Notice of Adverse Decisions in Interferences

In Interference No. 96,813 involving Patent No. 3,324,051, J. Lal, POLYMERIZATION OF EPOXIDES AND EPISULFIDES, final judgment adverse to the patentee was rendered May 20, 1970, as to claims 1, 2, 3, 5, 8, 9, 10, 12, 14, 15, 18 19 and 20.

[*Official Gazette March 6, 1973.*]